United States Patent
Oh et al.

(10) Patent No.: US 12,494,518 B2
(45) Date of Patent: Dec. 9, 2025

(54) CHARGING AND DISCHARGING APPARATUS COMPRISING SPACERS FOR SUPPORTING GAS POCKETS OF BATTERY CELLS

(71) Applicant: LG ENERGY SOLUTION, LTD., Seoul (KR)

(72) Inventors: Sae Young Oh, Daejeon (KR); Deok Hwan Kim, Daejeon (KR); Go Eun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 668 days.

(21) Appl. No.: 17/802,241

(22) PCT Filed: Sep. 29, 2021

(86) PCT No.: PCT/KR2021/013318
§ 371 (c)(1),
(2) Date: Aug. 25, 2022

(87) PCT Pub. No.: WO2022/092591
PCT Pub. Date: May 5, 2022

(65) Prior Publication Data
US 2023/0082653 A1    Mar. 16, 2023

(30) Foreign Application Priority Data
Oct. 27, 2020    (KR) .................. 10-2020-0139948

(51) Int. Cl.
*H01M 10/44*    (2006.01)
*H01M 50/471*    (2021.01)

(52) U.S. Cl.
CPC .......... *H01M 10/44* (2013.01); *H01M 50/471* (2021.01)

(58) Field of Classification Search
CPC .............. H01M 10/44; H01M 50/471; H01M 10/0468; H01M 10/0481; H01M 10/52;
(Continued)

(56) References Cited

U.S. PATENT DOCUMENTS 11,335,944 B2 *    5/2022    Son ..................... H01M 10/446
2002/0044253 A1 *    4/2002    Masuda ................ G02F 1/1333
349/190
(Continued)

FOREIGN PATENT DOCUMENTS

CN    107706457 A    2/2018
CN    108808145 A    11/2018
(Continued)

OTHER PUBLICATIONS

International Search Report (PCT/ISA/210) issued in PCT/KR2021/013318, dated Jan. 7, 2022.
(Continued)

*Primary Examiner* — M Baye Diao
(74) *Attorney, Agent, or Firm* — Birch, Stewart, Kolasch & Birch, LLP

(57) ABSTRACT

A charging and discharging device including a plurality of pressing plates and at least one spacer for supporting a gas pocket of a battery cell to prevent gas pocket interference between battery cells and increase the space utilization rate of the gas pocket during the formation process of the battery cell.

10 Claims, 8 Drawing Sheets

(58) Field of Classification Search
CPC ............. H01M 50/105; H01M 10/446; H01M 10/4285; Y02E 60/10; G01R 31/3865; H02J 7/0042
USPC .......................................................... 320/116
See application file for complete search history.

(56) References Cited

U.S. PATENT DOCUMENTS

| | | | |
|---|---|---|---|
| 2012/0312719 | A1 | 12/2012 | Fan et al. |
| 2018/0175364 | A1 | 6/2018 | Hong et al. |
| 2019/0379083 | A1 | 12/2019 | Jung et al. |
| 2020/0185695 | A1 | 6/2020 | Kim |
| 2020/0280090 | A1* | 9/2020 | Son ....................... H01M 10/42 |
| 2020/0365868 | A1* | 11/2020 | Son ................... H01M 10/0585 |
| 2021/0184272 | A1 | 6/2021 | Kwak et al. |

FOREIGN PATENT DOCUMENTS

| | | | |
|---|---|---|---|
| CN | 110447141 | A | 11/2019 |
| CN | 210074091 | U | 2/2020 |
| CN | 111226122 | A | 6/2020 |
| CN | 111276771 | A | 6/2020 |
| EP | 3706223 | A1 * | 9/2020 ............. H01M 10/04 |
| GB | 2294803 | A * | 5/1996 .......... H01M 50/489 |
| JP | 2002-169135 | A | 6/2002 |
| JP | 5445948 | B2 * | 3/2014 ............. G21C 3/356 |
| JP | 2018-198112 | A | 12/2018 |
| KR | 10-2012-0138660 | A | 12/2012 |
| KR | 10-2018-0076158 | A | 7/2018 |
| KR | 10-1896218 | B1 | 9/2018 |
| KR | 10-2019-0031847 | A | 3/2019 |
| KR | 10-2020-0017825 | A | 2/2020 |
| KR | 10-2020-0017826 | A | 2/2020 |
| KR | 10-2106111 | B1 | 4/2020 |
| KR | 10-2020-0068415 | A | 6/2020 |

OTHER PUBLICATIONS

Extended European Search Report for European Application No. 21886585.5, dated Sep. 10, 2024.

* cited by examiner

[FIG. 1]   CONVENTIONAL ART
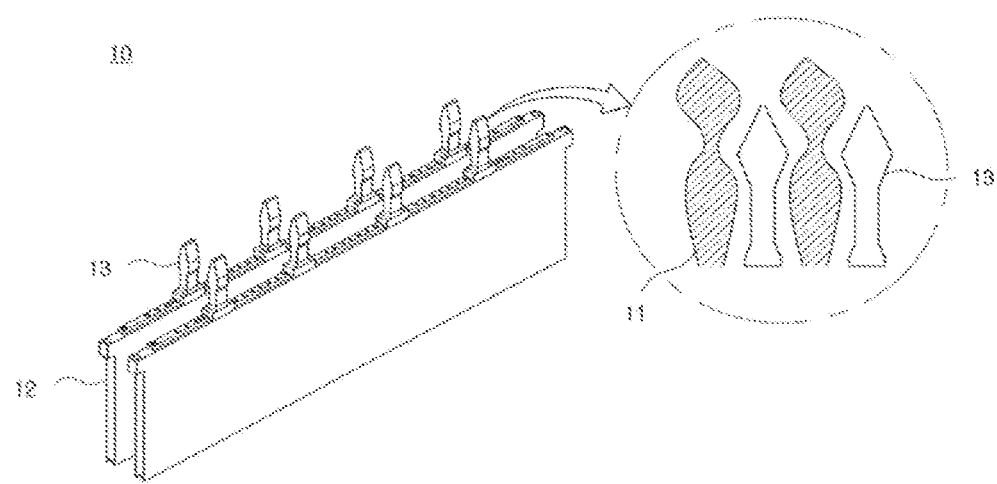

[FIG. 2a]    CONVENTIONAL ART
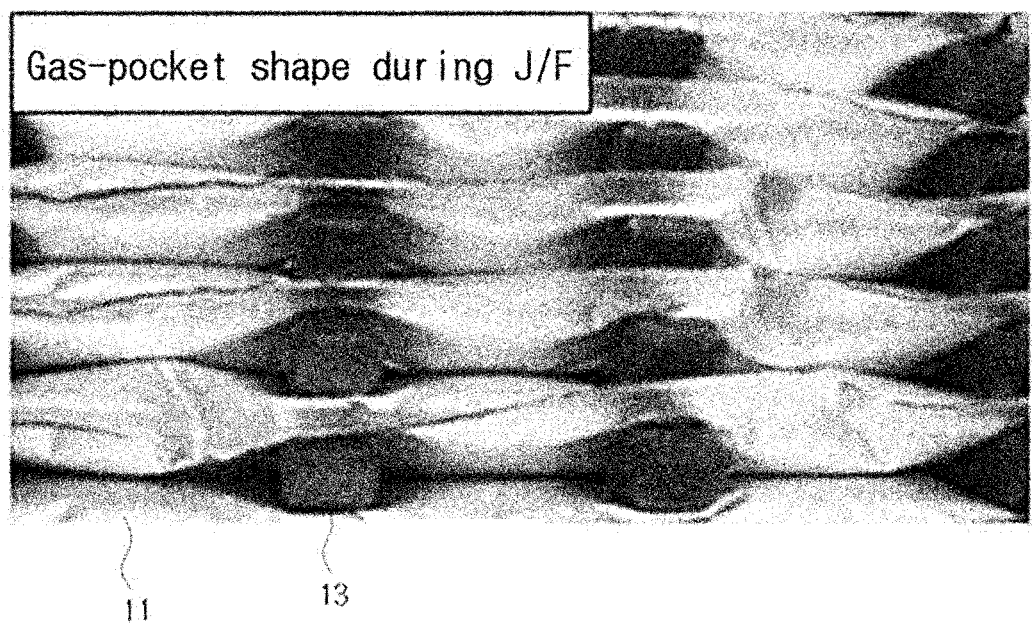

[FIG. 2b]   CONVENTIONAL ART
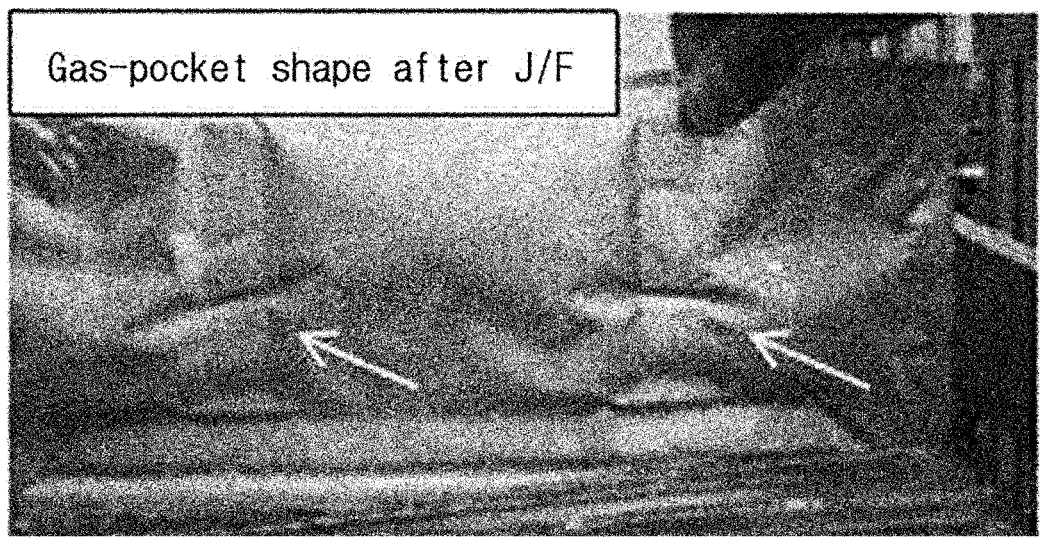

[FIG. 3]
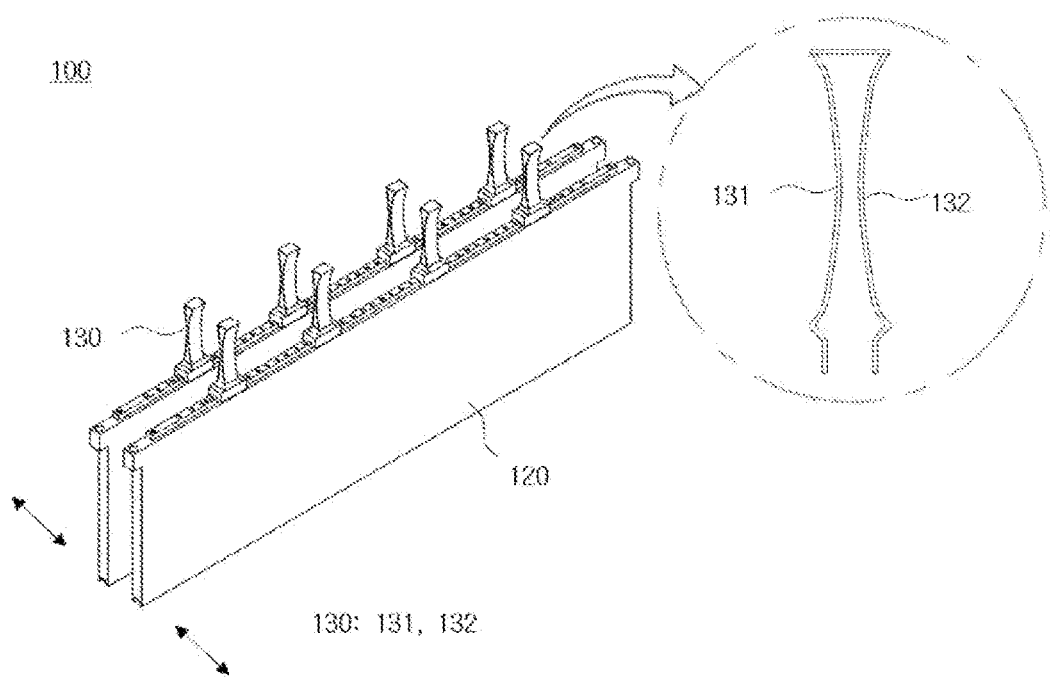

[FIG. 4]
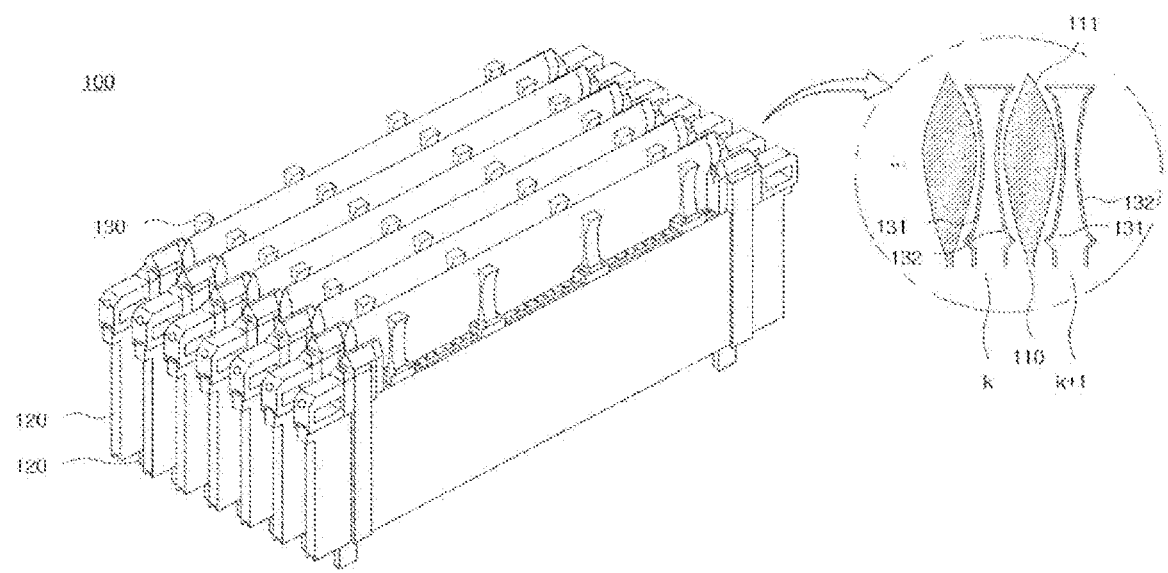

[FIG. 5]
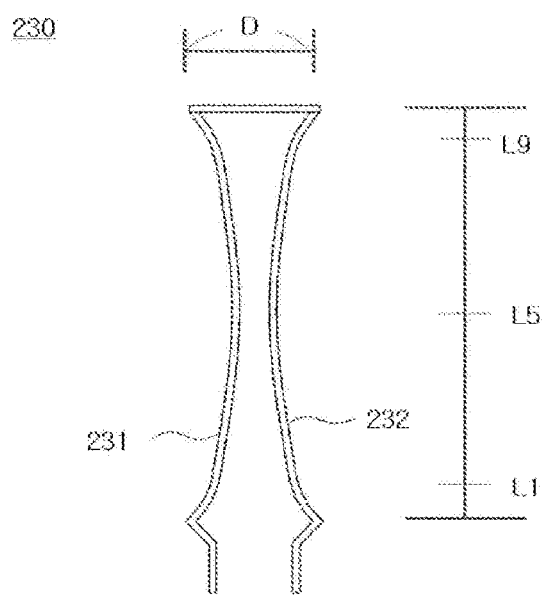

[FIG. 6]
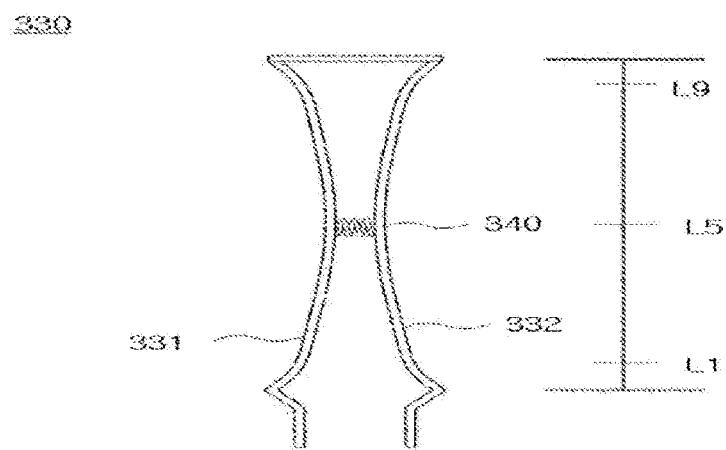

[FIG. 7]
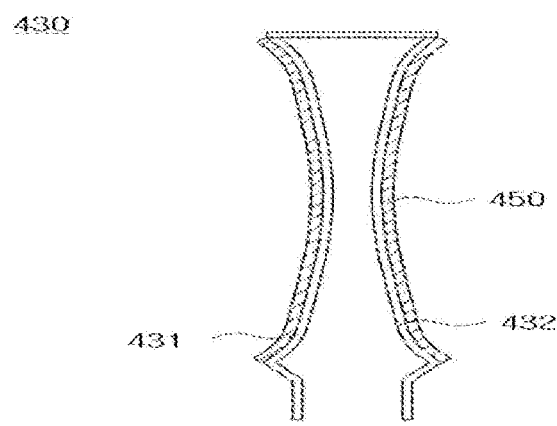

CHARGING AND DISCHARGING APPARATUS COMPRISING SPACERS FOR SUPPORTING GAS POCKETS OF BATTERY CELLS

TECHNICAL FIELD

This application claims the benefit of priority based on Korean Patent Application No. 10-2020-0139948, filed on Oct. 27, 2020, and the entire contents of the Korean patent application are incorporated herein by reference.

The present invention relates to a charging and discharging device including spacers for supporting a gas pocket of a battery cell.

BACKGROUND ART

Generally, the secondary battery may be divided into a cylindrical type, a prismatic type, a pouch type, etc., according to its shape. Herein, since the pouch type secondary battery is formed by using a pouch exterior material composed of a multilayer film including a metal layer (foil) and a synthetic resin layer coated on the upper and lower surfaces of the metal layer, the weight of the battery can be remarkably reduced compared to the cylindrical or square shape using metal cans, which makes it possible for the battery to be lightened and changed into various forms.

In such a pouch-type secondary battery, an electrode assembly is placed in a laminated form. An electrode tab and an electrode lead are connected to the electrode assembly, and the electrode lead protrudes from an exterior material of the pouch. Such an electrode lead is electrically connected to an external device through a contact and is supplied with power from the external device.

The pouch-type secondary battery (hereinafter, referred to as "battery cell") is manufactured through the process of assembling a cell and the process of activating the battery, and in the battery activation step, a battery cell is mounted on the charge and discharge device, and charge and discharge are performed as a condition which is necessary for activation. As described above, the process of performing a predetermined charge/discharge using a charging and discharging device for activation of the battery cell is referred to as a formation process.

In order to perform the formation process of such a battery cell, the battery cell should be properly mounted on the charging and discharging device. That is, the electrode lead of the battery cell needs to be disposed to contact the conductive portion of the charging and discharging device so that both are electrically connected, and the electrical connection state should be maintained while charging and discharging is in progress.

To this end, the charging and discharging device of the secondary battery generally includes a plurality of pressing plates for fixing a battery cell. Charging is performed by applying an electric current through the lead of the battery cell while applying pressure from two sides in a state that each battery cell is inserted between two pressing plates.

Likewise, it is possible to suppress the increase in the thickness of the battery cell according to gas generation during the charge and discharge process by pushing the battery cell using the pressing plate. At this time, the generated gas is collected in the gas pocket and is then removed after the formation process. Herein, the gas pocket is a portion extended in a direction perpendicular to the electrode lead in the cell body portion pressed during the formation process as a part of the pouch exterior material and may be cut in the pouch exterior material later.

FIG. 1 is a schematic diagram showing a pressing plate in a conventional secondary battery charging and discharging device. Referring to FIG. 1, a conventional secondary battery charging and discharging device 10 includes pressing plates 12 which are arranged at regular intervals to have a space for inserting a battery cell 11 and are movable to decrease the interval between the pressing plates 12, and spacers 13 of a curved surface are coupled to the pressing plates 12.

The spacer 13 coupled to the pressing plate 12 guides battery cells 11 to be induced into the space for cell insertion when each battery cell 11 is loaded to the space between pressing plates 12, and the spacer 13 supports the gas pocket of the battery cell 11 in order to prevent gas pocket interference between neighboring battery cells 11 at the time of formation process of the battery cell 11.

FIG. 2(a) is a photograph showing the shape of a gas pocket during a formation process of a battery cell in a conventional secondary battery charging and discharging device, and FIG. 2(b) is a photograph showing the shape of a gas pocket after the formation process of the battery cell. Referring to FIG. 2, it is seen that in the gas pocket of the battery cell, the region contacting the spacer has not sufficiently swelled. Namely, since a conventional spacer has a frame of a convex shape, the space utilization rate of the gas pocket drops.

Therefore, there is a need for a secondary battery charging and discharging device including a spacer capable of increasing the space utilization rate of the gas pocket.

DISCLOSURE

Technical Problem

The present invention is believed to solve at least some of the above problems. For example, an aspect of the present invention provides a secondary battery charging and discharging device including a spacer capable of preventing gas pocket interference between battery cells and increasing the space utilization rate of the gas pocket during the formation process of the battery cell.

Technical Solution

The present invention provides a charging and discharging device including spacers for supporting a gas pocket of a battery cell. In one example, a charging and discharging device according to the present invention includes: n pressing plates (n is an integer equal to or greater than 2); and at least one spacer which is coupled to one end of each of the pressing plates and support the gas pocket of a battery cell. Herein, the spacer includes a first surface and a second surface opposite to each other, and the first and second surfaces are concavely curved in a direction towards each other.

In one example, a length of the spacer in a vertical direction corresponds to or is greater than a length of a gas pocket in the vertical direction. In a specific example, the spacer has points L1, L5 and L9 along a length direction of the spacer, and a thickness of the spacer at the points L1, L5 and L9 satisfy the following conditions 1 and 2:

$$L1 > L5 \qquad \text{[Condition 1]}$$

$$L9 > L5 \qquad \text{[Condition 2]}$$

Herein, the L1 is a point corresponding to a 1/10 of an entire length of the spacer from a lowermost point of the spacer, the L5 is a point corresponding to a 5/10 of the entire length of the spacer from the lowermost point of the spacer, and the L9 is a point corresponding to a 9/10 of the entire length of the spacer from the lowermost point of the spacer.

In one example, the thickness of the spacer at the point L5 corresponds to 0.2 to 0.7 times of the thickness of the spacer at the point L1 or the point L9. More specifically, the thickness of the spacer may gradually decrease from the point L1 to the point L5, and the thickness of the spacer may gradually decrease from the point L9 to the point L5.

In another example, the spacer has a frame structure and includes an elastic pressing member at a center point between the first and second surfaces. In a specific example, the elastic pressing member is a coil spring, a leaf spring, or a rubber member.

In further another example, the spacer includes a protective layer at an external side of the first and second surfaces. In a specific example, the protective layer includes at least one selected from the group consisting of silicone, soft plastic and soft foam.

Further, the at least one spacer includes a plurality of spacers that may be coupled to the pressing plate along a longitudinal direction of the pressing plate.

Advantageous Effects

According to a charging and discharging device including spacers for supporting the gas pocket of a battery cell of the present invention, it is possible to increase the space utilization rate of the gas pocket of the battery cell by including a spacer having a structure corresponding to the shape of the gas pocket.

BRIEF DESCRIPTION OF THE DRAWINGS

FIG. 1 is a schematic diagram showing a pressing plate in a conventional secondary battery charging and discharging device.

FIG. 2(a) is a photograph showing the shape of a gas pocket during a formation process of a battery cell in a conventional secondary battery charging and discharging device, and FIG. 2(b) is a photograph showing the shape of a gas pocket after the formation process of the battery cell.

FIG. 3 is a schematic diagram showing a charging and discharging device according to one embodiment of the present invention.

FIG. 4 is a schematic diagram showing a state in which a plurality of battery cells are arranged in a charging and discharging device according to one embodiment of the present invention.

FIG. 5 is a schematic diagram showing a spacer in a charging and discharging device according to another embodiment of the present invention.

FIG. 6 is a schematic diagram showing a spacer in a charging and discharging device according to further another embodiment of the present invention.

FIG. 7 is a schematic diagram showing a spacer in a charging and discharging device according to further another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a charging and discharging device including spacers for supporting a gas pocket of a battery cell.

Generally, a charging and discharging device, which is used in the formation process of a battery cell, includes pressing plates which are arranged at regular intervals to have a space for inserting a battery cell and are movable to decrease the interval between the pressing plates, and spacers of a curved surface are coupled to the pressing plates. The spacer guides battery cells to be induced into the space for cell insertion when each battery cell is loaded to the space between pressing plates, and the spacer supports the gas pocket of the battery cell in order to prevent gas pocket interference between neighboring battery cells. However, since the conventional spacer has a frame of a convex shape, the gas pocket contacting the spacer does not sufficiently swell, which drops the space utilization rate of the gas pocket.

As such, the present invention provides a charging and discharging device including a spacer capable of preventing gas pocket interference between battery cells and increasing the space utilization rate of the gas pocket. Specifically, since the region of the spacer, which contacts the gas pocket, has a structure corresponding to that of the gas pocket, it is possible to increase the space utilization rate of the gas pocket of the battery cell.

Hereinafter, a charging and discharging device including spacers for supporting a gas pocket of a battery cell will be described in detail.

In one example, a charging and discharging device according to the present invention includes: n pressing plates (n is an integer equal to or greater than 2); and at least one spacer which is coupled to one end of each of the pressing plates. At this time, the spacer includes a first surface and a second surface opposite to each other, and the first and second surfaces are concavely curved in a direction in which the first and second surfaces oppose each other.

Generally, in the formation process, the battery cell may swell due to gas generation or expansion of the positive electrode plate and the negative electrode plate. At this time, the pressing plate prevents the swelling by pressing the battery cells during the formation process. Specifically, in the charging and discharging device according to the present invention, n pressing plates are arranged at regular intervals and are configured to be movable so that the interval may increase or decrease. Namely, a battery cell is arranged between a k-th pressing plate and a (k+1)-th pressing plate (k is equal to or greater than 1 and equal to or less than n−1), the k-th pressing plate and the (k+1)-th pressing plate are moved in a direction that presses two surfaces of the battery cell to thereby press the battery cell.

Further, n pressing plates are connected in a manner that allows a translational motion along the shaft extended in the lower portion, gears are connected to one end of the shaft, and a drive motor may be connected to the gears. Herein, any mechanical combination may be used as long as it has a driving mechanism capable of each pressing plate in a direction that presses battery cells.

The battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

Figures of the present invention show only a pouch-type battery cell having a form where a pair of electrode leads are withdrawn in the opposite direction for the convenience of explanation, but the battery cell, which is applied to the battery module according to the present invention, is not particularly limited thereto, and a pair of electrode leads may be withdrawn in the same direction. Herein, the pouch-type battery cell may include a gas pocket.

In one example, the n pressing plates may be made of a metal material having a high mechanical rigidity so that they are not deformed at high heat and pressure. For example, aluminum or stainless steel may be used. However, the material of the pressing plate is not limited to a metal material, and the pressing plate may also be made of reinforced plastic, reinforced ceramic, or tempered glass. Further, a charging and discharging device according to the present invention includes n pressing plates. Herein, the n may be in the range of 2 to 100, 2 to 50, 2 to 30, 2 to 20, 2 to 15 or 2 to 10.

In one example, battery cells including a gas pocket in a deactivated state are delivered by pickup equipment and are then inserted into a space between pressing plates. At this time, though not illustrated in the drawings, slipsheets are provided to protect the body surface of the battery cell from the pressing plate when pressed while supporting the battery cell to be positioned at a predetermined height. The slipsheet has a sheet form. One side of the slipsheet is coupled to a k-th pressing plate, the other side of the slipsheet is coupled to a (k+1)-th pressing plate, and the slipsheet is fold in the space for battery cell insertion between the k-th pressing plate and the (k+1)-th pressing plate. Namely, one slipsheet may be used per two pressing plates. A general slipsheet may be used for the charging and discharging device according to the present invention, and a detailed description thereof is omitted here.

In one example, the battery cell accommodated between respective pressing plates has a gas pocket at the upper portion, and the spacer coupled to each pressing plate supports the gas pocket. At this time, the spacer includes a first surface and a second surface opposite to each other, and the first and second surfaces are concavely curved in a direction in which the first and second surfaces oppose each other, thereby easily supporting the gas pocket of the activated battery cell.

In a specific example, one battery cell is arranged between a k-th pressing plate and a (k+1)-th pressing plate. At this time, the first surface of the spacer, which is coupled to the (k+1)-th pressing plate, and the second surface of the spacer, which is coupled to the k-th pressing plate, support the gas pocket of the battery cell. Herein, a height L of the spacer corresponds to or is greater than a length of a gas pocket. For example, the height L of the spacer corresponds to the length of the gas pocket. Namely, the first and second surfaces of the spacer can increase the space utilization rate of the gas pocket of the battery cell by having a structure corresponding to the shape of the gas pocket in the activated state.

In another example, in the charging and discharging device of the present invention, the height of the spacer coupled to the pressing plate corresponds to the length of the gas pocket. Specifically, the spacer has points L1, L5 and L9 in the height direction of the spacer, and thicknesses of L1, L5 and L9 satisfy following conditions 1 and 2:

$$L1 > L5 \qquad \text{[Condition 1]}$$

$$L9 > L5 \qquad \text{[Condition 2]}$$

Herein, the L1 is a point corresponding to a 1/10 of an entire height of the spacer 230, the L5 is a point corresponding to a 5/10 of the entire height of the spacer, and the L9 is a point corresponding to a 9/10 of the entire height of the spacer 230. This means that the thickness of the spacer at the point L5 is smaller than the thickness of the spacer at the points L1 and L9. Herein, the thickness of the spacer at the point L5 corresponds to 0.2 to 0.7 times of the thickness of the spacer at the point L1 or the point L9. Specifically, the thickness of the spacer at the point L5 corresponds to 0.3 to 0.6 times or 0.4 to 0.5 times of the thickness of the spacer at the point L1 or L9. For example, the thickness of the spacer at the point L5 corresponds to 0.4 times of the thickness of the spacer at the point L1. Herein, the thickness of the spacer means the interval or distance between the first surface and the second surface.

In a specific example, the thickness of the spacer may gradually decrease from the point L1 to the point L5, and the thickness of the spacer may gradually decrease from the point L9 to the point L5. For example, the cross-section of the spacer has a structure similar to that of a concave lens. The spacer is used to increase the space utilization rate of the gas pocket when the battery cell is activated.

In further another example, the spacer may have a frame structure. At this time, an elastic pressing member may be included in the center point between the first surface and the second surface. Specifically, the elastic pressing member may be installed at point L5 in the height direction of the spacer. Further, one side of the elastic pressing member may be coupled to the first surface of the spacer, and the other end of the elastic pressing member may be coupled to the second surface of the spacer.

In a specific example, the elastic pressing member may be a member which applies constant pressure in a direction in which the gas pocket is placed. The elastic pressing member is a coil spring, a leaf spring, or a rubber member. For example, the elastic pressing member may be a coil spring. The coil spring is a spring having a force resistant to the compressive force and refers to a compression spring.

Namely, as an elastic pressing member is included in the spacer, it is possible to easily support the gas pocket of the battery cell and maintain the shape between first surface and the second surface of the spacer.

In further another example, the spacer includes a protective layer. In a specific example, the spacer includes a protective layer at an external side of the first and second surfaces.

The protective layer is used to prevent a damage to the gas pocket of the battery cell contacting the spacer and may include at least one selected from the group consisting of silicone, soft plastic and soft foam. For example, a silicone pad may be coated on the first surface and the second surface of the spacer.

In one example, the spacer may be made of a nylon-based plastic material or fiber reinforced plastic material having excellent heat resistance and strength. Further, the spacer is coupled to one end of each of the pressing plates, and a plurality of spacers may be coupled to the pressing plate along a length of the pressing plate. It is illustrated in the drawings that one pressing plate has 4 spacers, but this has been determined in consideration of the length of the loaded battery cell, and the number and interval of the spacers may be changed according to the length of the battery cell.

DETAILED DESCRIPTION OF THE PREFERRED EMBODIMENTS

Hereinafter, various forms of a charging and discharging device including spacers for supporting a gas pocket of a battery cell will be described in detail with reference to drawings.

First Embodiment

FIG. 3 is a schematic diagram showing a charging and discharging device according to one embodiment of the present invention.

Referring to FIG. 3, a charging and discharging device 100 according to the present invention includes: n pressing plates 120 (n is an integer equal to or greater than 2); and at least one spacer 130 which is coupled to one end of each of the pressing plates. At this time, the spacer 130 includes a first surface 131 and a second surface 132 opposite to each other, wherein the first and second surfaces 131 and 132 are concavely curved in a direction in which the first and second surfaces oppose each other.

In the formation process, the battery cell may swell due to gas generation or expansion of the positive electrode plate and the negative electrode plate. At this time, the pressing plate 120 prevents the swelling by pressing the battery cells during the formation process. Specifically, in the charging and discharging device 100 according to the present invention, n pressing plates 120 are arranged at regular intervals and are configured to be movable so that the interval may increase or decrease. Namely, a battery cell is arranged between a k-th pressing plate and a (k+1)-th pressing plate (k is equal to or greater than 1 and equal to or less than n−1), the k-th pressing plate and the (k+1)-th pressing plate are moved in a direction that presses two surfaces of the battery cell to thereby press the battery cell.

Although not illustrated in the drawings, n pressing plates 120 are connected in a manner that allows a translational motion along the shaft extended in the lower portion, gears are connected to one end of the shaft, and a drive motor may be connected to the gears. Herein, any mechanical combination may be used as long as it has a driving mechanism capable of each pressing plate 120 in a direction that presses battery cells.

As described above, battery cells including a gas pocket in a deactivated state are delivered by pickup equipment and are then inserted into a space between pressing plates 120. At this time, though not illustrated in the drawings, slip-sheets are provided to protect the body surface of the battery cell from the pressing plate 120 when pressed while supporting the battery cell to be positioned at a predetermined height. A specific description thereof will be omitted.

The battery cell accommodated between respective pressing plates 120 has a gas pocket at the upper portion, and the spacer 130 coupled to each pressing plate 120 supports the gas pocket. At this time, the spacer 130 includes a first surface 131 and a second surface 132 opposite to each other, wherein the first and second surfaces 131 and 132 are concavely curved in a direction in which the first and second surfaces oppose each other, thereby easily supporting the gas pocket of the activated battery cell.

FIG. 4 is a schematic diagram showing a state in which a plurality of battery cells are arranged in a charging and discharging device according to one embodiment of the present invention.

Referring to FIG. 4, one battery cell 110 is arranged between a k-th pressing plate 120 and a (k+1)-th pressing plate 120. At this time, the first surface of the spacer 130, which is coupled to the (k+1)-th pressing plate 120, and the second surface of the spacer 130, which is coupled to the k-th pressing plate, support the gas pocket 111 of the battery cell.

Particularly, the height L of the spacer 130 corresponds to the length of the gas pocket 111, and the first and second surfaces 131 and 132 of the spacer 130 can increase the space utilization rate of the gas pocket 111 of the battery cell 110 by having a structure corresponding to the shape of the gas pocket 111 in the activated state. Further, it is illustrated that the charging and discharging device 100 according to the present invention includes 7 pressing plates 120, but the present invention is not limited to this example. Specifically, a charging and discharging device 100 according to the present invention includes n pressing plates. Herein, the n may be in the range of 2 to 100, 2 to 50, 2 to 30, 2 to 20, 2 to 15 or 2 to 10.

Second Embodiment

FIG. 5 is a schematic diagram showing a spacer in a charging and discharging device according to another embodiment of the present invention.

Referring to FIG. 5, in the charging and discharging device of the present invention, the height of the spacer 230 coupled to the pressing plate corresponds to the length of the gas pocket. Specifically, the spacer 230 has points L1, L5 and L9 in the height direction of the spacer, and thicknesses of L1, L5 and L9 satisfy following conditions 1 and 2:

$$L1 > L5 \qquad \text{[Condition 1]}$$

$$L9 > L5 \qquad \text{[Condition 2]}$$

Herein, the L1 is a point corresponding to a $1/10$ of an entire height of the spacer 230, the L5 is a point corresponding to a $5/10$ of the entire height of the spacer, and the L9 is a point corresponding to a $9/10$ of the entire height of the spacer 230. This means that the thickness of the spacer 230 at the point L5 is smaller than the thickness of the spacer 230 at the points L1 and L9. Herein, the thickness of the spacer 230 at the point L5 corresponds to 0.2 to 0.7 times of the thickness of the spacer 230 at the point L1 or the point L9. For example, the thickness of the spacer 230 at the point L5 corresponds to 0.4 times of the thickness of the spacer 230 at the point L1. Herein, the thickness of the spacer 230 means the interval or distance between the first surface 231 and the second surface 232.

Further, the thickness of the spacer 230 may gradually decrease from the point L1 to the point L5, and the thickness of the spacer may gradually decrease from the point L9 to the point L5. Specifically, the cross-section of the spacer 230 has a structure similar to that of a concave lens. The spacer 230 is used to increase the space utilization rate of the gas pocket when the battery cell is activated.

Third Embodiment

FIG. 6 is a schematic diagram showing a spacer in a charging and discharging device according to further another embodiment of the present invention.

Referring to FIG. 6, the spacer 330 has a frame structure. Herein, an elastic pressing member 340 is included in the central region between the first surface 331 and the second surface 332. Specifically, the elastic pressing member 340 is installed at point L5 in the height direction of the spacer 330. One side of the elastic pressing member 340 may be coupled to the first surface 331 of the spacer 330, and the other end of the elastic pressing member 340 may be coupled to the second surface 332 of the spacer 330.

Specifically, the elastic pressing member 340 may be a coil spring. As an elastic pressing member 340 is included in the spacer 330, it is possible to easily support the gas pocket of the battery cell and maintain the shape between first surface 331 and the second surface 332 of the spacer 330.

Fourth Embodiment

FIG. 7 is a schematic diagram showing a spacer in a charging and discharging device according to further another embodiment of the present invention.

Referring to FIG. 7, the spacer 430 includes a protective layer 450. The protective layer 450 is formed at the external side of the first and second surfaces 431 and 432 of the spacer 430. Specifically, the protective layer 450 is used to prevent a damage to the gas pocket of the battery cell contacting the spacer 430, and a silicone pad is coated on the first surface 431 and the second surface 432 of the spacer 430.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 10, 100: charging and discharging device
11, 110: battery cell
111: gas pocket
12, 120: pressing plate
13, 130, 230, 330, 430: spacer
131, 231, 331, 431: first surface
132, 232, 332, 432: second surface
340: elastic pressing member
450: protective layer

The invention claimed is:

1. A charging and discharging device comprising:
n pressing plates, wherein n is an integer equal to or greater than two; and
at least one spacer coupled to one end of each of the pressing plates, the spacer being configured to support a gas pocket of a battery cell, the spacer including:
a frame structure having a first surface and a second surface opposite to each other, the first surface and the second surface being concavely curved toward each other; and
an elastic pressing member at a center point between the first and second surfaces.

2. The charging and discharging device of claim 1, wherein a length of the spacer in a vertical direction corresponds to or is greater than a length of the gas pocket in the vertical direction.

3. The charging and discharging device of claim 1, wherein the spacer has a frame structure and includes an elastic pressing member at a center point between the first and second surfaces.

4. The charging and discharging device of claim 1, wherein the elastic pressing member is a coil spring, a leaf spring, or a rubber member.

5. The charging and discharging device of claim 1, wherein the at least one spacer includes a plurality of spacers that are coupled to the pressing plate along a longitudinal direction of the pressing plate.

6. A charging and discharging device comprising:
n pressing plates, wherein n is an integer equal to or greater than two; and
at least one spacer coupled to one end of each of the pressing plates, the spacer being configured to support a gas pocket of a battery cell, the spacer including a first surface and a second surface opposite to each other, the first surface and the second surface being concavely curved toward each other,
wherein the spacer has points L1, L5 and L9 along a length direction of the spacer, and
wherein a thickness of the spacer at the points L1, L5 and L9 satisfy the following conditions 1 and 2:

$$L1 > L5 \quad \text{[Condition 1]}$$

$$L9 > L5 \quad \text{[Condition 2]}$$

wherein the L1 is a point corresponding to a ¹⁄₁₀ of an entire length of the spacer from a lowermost point of the spacer, the L5 is a point corresponding to a ⁵⁄₁₀ of the entire length of the spacer from the lowermost point of the spacer, and the L9 is a point corresponding to a ⁹⁄₁₀ of the entire length of the spacer from the lowermost point of the spacer.

7. The charging and discharging device of claim 6, wherein the thickness of the spacer at the point L5 corresponds to 0.2 to 0.7 times of the thickness of the spacer at the point L1 or the point L9.

8. The charging and discharging device of claim 6, wherein the thickness of the spacer gradually decreases from the point L1 to the point L5, and the thickness of the spacer gradually decreases from the point L9 to the point L5.

9. A charging and discharging device comprising:
n pressing plates, wherein n is an integer equal to or greater than two; and
at least one spacer coupled to one end of each of the pressing plates, the spacer being configured to support a gas pocket of a battery cell, the spacer including a first surface and a second surface opposite to each other, the first surface and the second surface being concavely curved toward each other,
wherein the spacer includes a protective layer on an external side of the first and second surfaces.

10. The charging and discharging device of claim 9, wherein the protective layer includes at least one selected from the group consisting of silicone, soft plastic and soft foam.

\* \* \* \* \*